(12) United States Patent
Song et al.

(10) Patent No.: US 10,264,142 B2
(45) Date of Patent: Apr. 16, 2019

(54) DISPLAY APPARATUS AND CONTROL METHOD THEREOF

(71) Applicant: SAMSUNG ELECTRONICS CO., LTD., Suwon-si (KR)

(72) Inventors: Won-seok Song, Seoul (KR); Shin-haeng Kim, Suwon-si (KR); Yoo-sun Jung, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/665,497

(22) Filed: Aug. 1, 2017

(65) Prior Publication Data

US 2018/0183947 A1 Jun. 28, 2018

(30) Foreign Application Priority Data

Dec. 23, 2016 (KR) ........................ 10-2016-0178455

(51) Int. Cl.
| | | |
|---|---|---|
| *H04N 1/00* | (2006.01) | |
| *G02F 1/1335* | (2006.01) | |
| *G09G 3/00* | (2006.01) | |
| *G02F 1/1333* | (2006.01) | |
| *H04N 1/031* | (2006.01) | |

(52) U.S. Cl.
CPC ... *H04N 1/00135* (2013.01); *G02F 1/133602* (2013.01); *G09G 3/00* (2013.01); *H04N 1/00233* (2013.01); *G02F 2001/133317* (2013.01); *H04N 1/0316* (2013.01)

(58) Field of Classification Search
CPC ... G09G 2320/0247; G09G 2300/0426; G09G 2340/0435; G09G 3/342; G02B 2027/0112; G02B 2027/0116; G02B 2027/0118; G02F 1/1336; G02F 1/133602
See application file for complete search history.

(56) References Cited

U.S. PATENT DOCUMENTS

| | | |
|---|---|---|
| 7,148,868 B2 | 12/2006 | Lee |
| 2011/0279467 A1 | 11/2011 | Kim et al. |
| 2015/0338709 A1* | 11/2015 | Yoshida ............ G02F 1/136277 257/59 |

FOREIGN PATENT DOCUMENTS

| | | |
|---|---|---|
| JP | 2004-4918 A | 1/2004 |
| JP | 5009383 B2 | 8/2012 |
| KR | 10-0853210 B1 | 8/2008 |
| KR | 10-2011-0124933 A | 11/2011 |
| KR | 10-1502862 B1 | 3/2015 |
| KR | 10-2015-0075641 A | 7/2015 |

* cited by examiner

*Primary Examiner* — Gerald Johnson
(74) *Attorney, Agent, or Firm* — Sughrue Mion, PLLC

(57) ABSTRACT

A display apparatus and a control method thereof are provided. The method includes receiving image data, processing the image data, and dividing a display panel into a plurality of regions, synchronizing a scanning timing of the image data at which the processed image data is scanned in a first region among the plurality of regions with a backlight-on timing of the display panel, and outputting the processed image data in the display panel. The outputting the processed image data includes compensating and outputting the processed image data according to a relation between a scanning timing of the image data for each region of the plurality of regions of the display panel and the synchronized backlight-on timing.

20 Claims, 11 Drawing Sheets

DISPLAY APPARATUS AND CONTROL METHOD THEREOF

CROSS-REFERENCE TO RELATED APPLICATION

This application claims the benefit, under 35 U.S.C. § 119(a), of Korean Patent Application No. 10-2016-0178455, filed on Dec. 23, 2016 in the Korean Intellectual Property Office, the disclosure of which is incorporated herein by reference in its entirety.

BACKGROUND

1. Field

Methods and apparatuses consistent with exemplary embodiments relate to a display apparatus and a control method thereof, and more particularly, to a display apparatus and a control method for removing a residual image and a double image of a display.

2. Related Art

In general, a Liquid Crystal Display (LCD) includes a liquid crystal panel for displaying a content, such as an image or a video, a driver for driving the liquid crystal panel, and a backlight for supplying light to the liquid crystal panel.

The liquid crystal panel drives the liquid crystal by forming an electric field by supplying a driving voltage from the driver, and adjusting transmittance of the light supplied from the backlight.

In this case, a problem of a residual image and motion blur may occur in the display due to a slow response speed of the liquid crystal of the liquid crystal panel. In order to resolve this problem, a Dynamic Capacitance Compensation (DCC) method for increasing the response speed of the liquid crystal and a backlight-on/off method (turn on/off backlights) is commonly used.

The DCC method is based on the characteristic of the liquid crystal that a state of the liquid crystal changes quickly with a greater difference between a voltage which is currently applied to the liquid crystal and a voltage which is newly applied.

The backlight-on/off method controls the backlights in order to output a screen in a stabilization section which is close to a desired value of the liquid crystal. That is, the motion blur may be reduced by not displaying a screen in an initial variation section where the liquid crystal changes.

However, in this case, a backlight-on/off timing and a scanning timing of image data should be synchronized for each region of the content. For example, in response to the backlight-on/off timing not being synchronized with the scanning timing of the image data, a residual image and a double image may occur whereas the motion blue is reduced. In addition, in response to the backlights being arranged in a horizontal direction in the liquid crystal panel, the backlight-on/off timing cannot be synchronized with the scanning timing of the image data which proceeds in a vertical direction of the liquid crystal panel (from an upper region to a lower region or from the lower region to the upper region).

In response to the backlights being arranged in a lattice manner or in a vertical direction in the liquid crystal panel, and in response to a display apparatus not supporting a function of controlling an individual unit of the backlight, the backlight-on/off timing and the scanning timing of the image data cannot be synchronized.

When a display apparatus supports the function of controlling an individual unit of the backlight, the display apparatus may perform 'local backlight-on/off.' When the display apparatus does not support the function of controlling an individual unit of the backlight, the display apparatus may perform 'global backlight-on/off.'

In case of the global backlight-on/off method, a double image may occur in upper, middle, and lower regions of a screen according to a position where the backlights are turned on in the liquid crystal panel. For example, in response to the backlight-on/off timing being set for the middle region of the liquid crystal panel, data of a previous frame and data of a present frame of the content may be mixed and outputted in the lower region of the screen. Further, the data of the present frame and the data of a next frame may be mixed and outputted in the upper region of the screen.

SUMMARY

Aspects of the present disclosure address at least the above mentioned problems and/or disadvantages to provide at least the advantages described below, and an aspect of the present disclosure is to provide a display apparatus and a control method for removing a residual image and a double image in a display panel by differently applying Dynamic Capacitance Compensation (DCC) to each region of the display panel by using a backlight-on timing and a scanning timing of the image data.

According to an aspect of an exemplary embodiment, there is provided a control method to control a display apparatus, the method including: receiving image data; processing the image data; and dividing a display panel into a plurality of regions, synchronizing a scanning timing of the image data at which the processed image data is scanned in a first region among the plurality of regions with a backlight-on timing of the display panel, and outputting the processed image data in the display panel, the outputting the processed image data including compensating and outputting the processed image data according to a relation between a scanning timing of the image data for each region of the plurality of regions of the display panel and the synchronized backlight-on timing.

The compensating and outputting the processed image data may include compensating the processed image data by applying a Dynamic Capacitance Compensation (DCC) gain value of the image data to the first region by using on a pre-stored look-up table.

The compensating and outputting the processed image data may further include determining a DCC gain value according to a difference between the scanning timing of the image data for each region of the plurality of regions of the display panel and the synchronized backlight-on timing, and compensating the processed image data by applying a corresponding DCC gain value for each of the plurality of regions.

A second region among the plurality of regions may have a later scanning timing of the image data than the first region, and a second DCC gain value corresponding to the second region may be greater than a first DCC gain value corresponding to the first region.

The scanning timing of the image data at which the processed image data is scanned to the first region may correspond to a point of time when scanning of the image data starts in a center part of the first region.

The backlight-on timing of the display panel may be synchronized with a timing at which scanning of the image data starts in the first region.

The backlight-on timing of the display panel may be synchronized with a timing at which scanning of the image data starts in a certain region among the plurality of regions.

The plurality of regions may be divided according to an order that the image data is scanned in the display panel.

The plurality of regions may include an upper region, a middle region, and a lower region, the first region may be one among the upper region, the middle region, and the lower region, and scanning of the image data may start initially in the first region according to an order that the image data is outputted in the display panel.

The control method may further include setting the backlight-on timing and a backlight-on section based on a vertical synchronization signal of the image data.

According to an aspect of another exemplary embodiment, there is provided a display apparatus including: a display panel; a plurality of backlights configured to supply light to the display panel; a backlight driver configured to control the plurality of backlights; and a processor configured to: control the backlight driver to process image data received in the display panel, divide the display panel into a plurality of regions; synchronize a scanning timing of the image data at which the processed image data is scanned in a first region among the plurality of regions with a backlight-on timing of the display panel; and compensate and output the processed image data according to a relation between a scanning timing of the image data for each region of the plurality of regions of the display panel and the synchronized backlight-on timing.

The display apparatus may further include a memory, and the processor may be further configured to compensate the processed image data by applying a Dynamic Capacitance Compensation (DCC) gain value of the image data to the first region by using a look-up table pre-stored in the memory.

The processor may be further configured to determine a DCC gain value according to a difference between the scanning timing of the image data for each region of the plurality of regions and the synchronized backlight-on timing, and compensate the processed image data by applying a corresponding DCC gain value for each of the plurality of regions.

A second region among the plurality of regions may have a later scanning timing of the image data than the first region, and a second DCC gain value corresponding to the second region may be greater than a first DCC gain value corresponding to the first region.

The processor may be further configured to divide the plurality of regions according to an order that the image data is scanned in the display panel.

The scanning timing of the image data at which the processed image data is scanned to the first region may correspond to a point of time when scanning of the image data starts in a center part of the first region.

The backlight-on timing of the display panel may be synchronized with a timing at which scanning of the image data starts in the first region.

The backlight-on timing of the display panel may be synchronized with a timing at which scanning of the image data starts in a certain region among the plurality of regions.

The plurality of regions of the display panel may include an upper region, a middle region, and a lower region, the first region may be one among the upper region, the middle region, and the lower region, and scanning of the image data may start initially in the first region according to an order that the image data is outputted in the display panel.

The processor may be further configured to control the backlight driver to set the backlight-on timing and a backlight-on section based on a vertical synchronization signal of the image data.

According to the above-described embodiments of the present disclosure, a display apparatus and a control method thereof may remove a residual image and a double image outputted in a display panel by applying different DCC values to pixels of the image data for each region of the display panel based on the scanning timing of the image data and the backlight-on/off timing, even when the display apparatus does not support synchronization of the backlight-on timing and the scanning timing of the input data.

BRIEF DESCRIPTION OF DRAWINGS

The above and/or other aspects will be more apparent from the following description of exemplary embodiments with reference to the accompanying drawings, in which.

DETAILED DESCRIPTION

Figure 1:
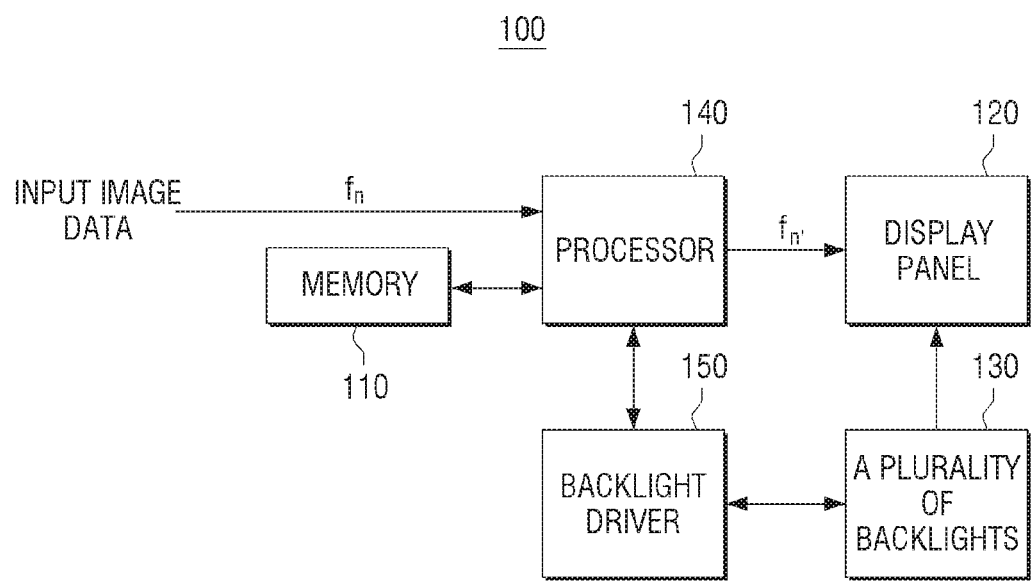
FIG. 1 is a block diagram illustrating a structure of a display apparatus, according to an exemplary embodiment.

Hereinafter, terms used in the following description will be described briefly in advance of presenting a detailed description of exemplary embodiments.

In the present disclosure, a term 'module' or 'unit' refers to an element that performs at least one function or operation. The 'module' or 'unit' may be realized as hardware, software, or combinations thereof. A plurality of 'modules' or 'units' may be integrated into at least one module and realized as at least one processor (not shown), except for a case where the respective 'modules' or 'units' need to be realized as discrete specific hardware.

Certain exemplary embodiments are described in greater detail below with reference to the accompanying drawings. The exemplary embodiments will be described in detail enough to be easily embodied by a person having ordinary skill in the art (hereinafter referred to as 'those skilled in the art'). The present disclosure may be realized as various different forms and are not limited to the exemplary embodiments herein. In the accompanying drawings, a part unrelated to the description is omitted for a more clear description, and like drawing reference numerals are used for the like elements, even in different drawings, throughout the entire specification.

FIG. 1 is a block diagram illustrating a structure of a display apparatus, according to an exemplary embodiment.

Referring to FIG. 1, a display apparatus 100 includes a memory 110, a display panel 120, a plurality of backlights 130, a processor 140, and a backlight driver 150 configured to control the plurality of backlights 130. FIG. 1 is an example for illustrative purpose and may further include other component.

For example, the display apparatus 100 may further include a timing controller (not shown), a gate driver (not shown), a data driver (not shown), and a voltage driver (not shown).

The timing controller may receive a clock signal, a horizontal synchronization signal, or a vertical synchronization signal and generate a gate control signal and a data control signal. The gate driver may apply a gate on/off voltage received from the voltage driver to the display panel 120 according to the gate control signal generated by the timing controller. The data driver may input RGB data of an image frame into the display panel 120 according to the data control signal generated by the timing controller.

According to an exemplary embodiment, the memory 110 and the processor 140 may be located inside the timing controller. Further, the memory 110 and the processor 140 may be located outside the timing controller.

The display apparatus 100 may be various kinds of electronic apparatuses that receive an image signal from an external source and display an image in the display panel 120. Further, the display apparatus 100 may be electronic apparatuses that display image data stored in the display apparatus 100 in the display panel 120. As an example, the display apparatus 100 may be a portable terminal, such as, a television (TV), a computer, a tablet computer, a smart phone, or the like, but not limited thereto. In the exemplary embodiments, an image may include diverse contents, such as, an image, text, a video, an image and/or video with audio, an image and/or video without audio, or the like.

The memory 110 may store a current image frame $f_n$ and a previous image frame $f_{n-1}$ of the image data. In this case, the current image frame $f_n$ and the previous image frame $f_{n-1}$ may be stored in the same memory buffer, but this is only an example, and the previous image frame $f_{n-1}$ may be stored in another memory buffer. The memory 110 may store a DCC look-up table on a comparison of the current image frame $f_n$ with the previous image frame $f_{n-1}$.

The memory 110 may store a DCC look-up table pre-stored in a manufacturing process of the display apparatus 100. According to an exemplary embodiment, the memory 110 may store a DCC look-up table where DCC gain values calculated for each region are applied to a plurality of regions of the display panel 120. The DCC look-up table which is pre-stored in the memory 110 may be a common DCC look-up table used in a display apparatus having a liquid crystal display panel.

The display panel 120 may display the image data compensated by the processor 140. The display panel 120 may include a 'liquid crystal panel' forming a Liquid Crystal Display (LCD). The liquid crystal panel has pixel regions defined by a region at which a plurality of data lines intersect with a plurality of gate lines on a substrate using glass or the like. Each pixel region may have a liquid crystal capacitor (Clc) connected to a Thin Film Transistor (TFT). The liquid crystal capacitor (Clc) may include a pixel electrode connected to the TFT and a common electrode that faces the pixel electrode with the liquid crystal between. The TFT may supply a data signal received from each data line to the pixel electrode in response to a scan pulse from each gate line. The liquid crystal capacitor (Clc) may charge a voltage difference between the data signal supplied to the pixel electrode and a common voltage applied to the common electrode and adjust light transmittance by varying an arrangement of liquid crystal molecules according to the voltage difference thereby realizing a gray scale. In this exemplary embodiment, the display panel is an LCD panel, but this is only an example for convenience in explanation, and the display panel is not limited thereto. The plurality of backlights 130 may be a plurality of LED arrays (or OLED arrays) where a plurality of Light Emitting Diodes (LED) (or Organic Light Emitting Diodes (OLED) are connected in parallel or in series, but not limited thereto.

The backlight driver 150 (or a backlight driving circuit) may control a backlight-on/off timing, that is, a timing for turning on or turning off the plurality of backlights 130 that supply the light to the display panel 120. The backlight driver 150 may control an ON section and an OFF section of the LED arrays according to a duty ratio of the backlight-on/off timing.

The plurality of backlights 130 may be arranged so as to generate the light for the respective regions of the display panel 120 by being arranged to correspond to each of the plurality of regions. The plurality of backlights 130 may include a linear light source, such as, a lamp, or a point light source, such as, the light emitting diodes, but not limited thereto.

Generally, in response to the display apparatus 100 supporting the global backlight-on/off operation, the backlight driver 150 may control the backlight-on/off timing of the plurality of backlights 130 as a group. In the global backlight-on/off operation, a timing at which the plurality of backlights 130 are turned on or turned off in the display panel 120 may be the same for the respective backlights.

In response to the display apparatus 100 supporting the local backlight-on/off operation, the display apparatus 100 may include a plurality of backlight units consisting of a plurality of backlights. The backlight driver 150 may control the backlight-on/off timing of the respective backlights in each of the plurality of backlight units for each unit.

The processor 140 may be an image processor that image-processes an image signal received from an external source and outputs the processed image signal in the display panel 120. The processor 140 may compensate a DCC value for the processed image data (for example, decoded image data) and output the compensated image data in the display panel 120. The processor 140 may store the current image frame $f_n$ received in the display apparatus 100 in the memory 110. Further, the processor 140 may generate a compensated image frame $f_{n'}$ based on the DCC look-up table pre-stored in the memory 110.

The processor 140 may control the display panel 120 to output the compensated (or corrected) image frame $f_{n'}$ in the display panel 120 by using the scanning timing of the image data at which the image data is scanned in the display panel 120 and the backlight-on timing received from the backlight driver 150. In this case, the compensation (or correction) of an image may be performed by applying different DCC gain values for the respective regions of the display panel 120.

The processor 140 may process the image data received in the display apparatus 100 (for example, decoding or de-multiplexing). The processor 140 may divide the display panel 120 into a plurality of regions, synchronize the scanning timing of the image data at which the processed image data is scanned in at least one region among the plurality of regions with the backlight-on timing of the display panel 120, and output the processed image data in the display panel 120.

The processor 140 may compensate and output the processed image data in the display panel 120 according to a relation between the scanning timing of the image data at which the processed image data is scanned in each region of the plurality of regions of the display panel 120 and the synchronized backlight-on timing.

In this case, the processor 140 may compensate a pixel value of the image data by applying the DCC gain value of the image data to at least one region among the plurality of regions of the display panel 120. The DCC gain value may be calculated by using the look-up table pre-stored in the memory 110 (for example, a DCC look-up table).

The processor 140 may determine the DCC gain value according to a difference between the scanning timing of the image data for each region of the plurality of regions of the display panel 120 and the synchronized backlight-on timing. In this case, the DCC gain value may increase with a later scanning timing of the image data in the display panel 120.

The scanning timing of the image data may be a timing at which scanning of the image data starts in a center part of at least one region among the plurality of regions of the display panel 120. Further, the scanning timing of the image data may be a timing at which the scanning of the image data is finished in at least one region among the plurality of regions of the display panel 120. The scanning timing of the image data may be a random timing while the image data is scanned in a certain point of the at least one region of the display panel 120. This example is only an exemplary embodiment for illustrative purpose, and the scanning timing of the image data is not limited thereto.

According to an exemplary embodiment, the backlight-on timing of the plurality of backlights 130 may be synchronized with a timing at which the scanning of the image data starts in a predetermined region among the plurality of regions of the display panel 120.

In response to the image data being scanned from top to bottom of the display panel 120, the processor 140 may synchronize a start time when the scanning of the image data starts with the backlight-on timing of the plurality of backlights 130 in an upper region of the display panel 120, but not limited thereto.

According to another exemplary embodiment, the backlight-on timing of the plurality of backlights 130 may be synchronized with a timing at which the scanning of the image data starts in a certain region among the plurality of regions of the display panel 120.

The processor 140 may divide the display panel 120 into a plurality of regions according to an order that the image data is scanned in the display panel 120. The processor 140 may divide the display panel 120 into an upper region, a middle region, and a lower region with reference to a region where the scanning of the image data starts initially in the display panel 120 according to an order the image data is outputted in the display panel 120.

Further, the processor 140 may divide the display panel 120 into the plurality of regions according to the scanning timing of the image data in the display panel 120.

To be specific, the image data may be scanned in one direction in the display panel 120. In response to a start point where the scanning of the image data starts in the display panel 120 being the upper region of the display panel 120, the image may be outputted in the display panel 120 in the order of the upper region, the middle region, and the lower region. In response to the start point where the scanning of the image data starts in the display panel 120 being the middle region of the display panel 120, the image may be outputted in the display panel 120 in the order of the middle region, the lower region, and the upper region. In response to the start point where the scanning of the image data starts in the display panel 120 being the lower region of the display panel 120, the image may be outputted in the display panel 120 in the order of the lower region, the upper region, and the middle region. In this exemplary embodiment, the plurality of regions of the display panel 120 are divided into the upper, middle, and lower regions, but this is only an example. The plurality of regions of the display panel 120 may be divided into regions less than three or more than four.

The processor 140 may determine a region where the image data is scanned initially among the plurality of regions of the display panel 120 as the upper region of the display panel 120 and control the backlight driver 150 to synchronize the scanning timing of the image data in the upper region with the backlight-on timing of the plurality of backlights 130.

The processor 140 may control the backlight driver 150 to set a duty ratio of the backlight-on timing and a backlight-on section of the plurality of backlights 130 based on a vertical synchronization signal of the image data in the upper region of the display panel 120.

In this exemplary embodiment, the scanning timing of the image data in the upper region is synchronized with the backlight-on timing of the plurality of backlights 130, but this is only an example and not limited thereto.

Figure 2:
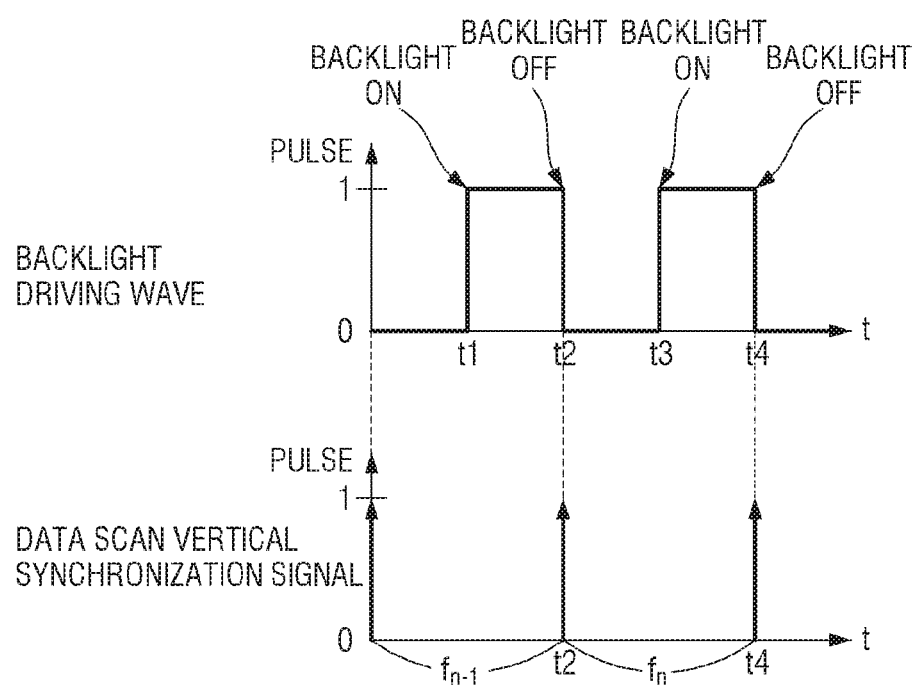
FIG. 2 is a diagram provided to describe a scanning timing of image data and a backlight-on timing, according to an exemplary embodiment.

FIG. 2 is a diagram provided to describe a scanning timing of image data and a backlight-on timing, according to an exemplary embodiment.

Referring to FIG. 2, a signal of a previous image frame $f_{n-1}$ and a signal of a current image frame $f_n$ representing one image frame may be displayed in the display panel 120 during a certain period (t2, t4-t2), respectively. The image signals of the image frames $f_{n-1}$ and $f_n$ may be classified by the vertical synchronization signal in each period (0, t2, t4). In FIG. 2, a start point of the scanning timing of the image data is '0' for convenience in explanation, but it may be understood that the scanning of the image data starts at the point of time after '0'.

The backlights may be controlled by the backlight driver 150 so as to be turned on in order to display the image frames $f_{n-1}$, $f_n$. For example, in order to display the previous image frame $f_{n-1}$, the backlights may have a delay time t1. The backlights may be turned on at t1 and turned off at t2. In this case, the previous image frame $f_{n-1}$ may be displayed in the display panel 120 at a backlight-on section t2-t1. In order to display the current image frame $f_n$, the backlights may have a delay time t3-t2. The backlights may be turned on at t3 and turned off at t4. In this case, the current image frame $f_n$ may be displayed in the display panel 120 at a backlight-on section t4-t3.

The backlight driver 150 described in FIG. 1 may set the delay time t1, t3-t2 and the backlight-on section t2-t1, t4-t3 of the backlight-on/off timing based on the vertical synchronization signal of the image data. The delay time t1, t3-t2 of the backlight-on/off timing may be a time before the backlights are turned on, and the backlight-on section t2-t1, t4-t3 may be a time section while the backlights are turned on at t1, t3 and then turned off at t2, t4. The backlight-on section t2-t1, t4-t3 may be a section where the image data may be displayed in the display panel 120. For the delay time t1, t3-t2 of the backlight-on/off timing and the backlight-on section t2-t1, t4-t3, a predetermined value may be provided in a manufacturing process of the display apparatus 100. Further, the delay time t1, t3-t2 of the backlight-on/off timing and the backlight-on section t2-t1, t4-t3 may vary depending on the characteristic of the image signal.

The backlight driver 150 may set the backlight-on/off timing $t_b$ to be a backlight-on moment t1, t3, a backlight-off moment t2, t4, an intermediate time value between the backlight-on moment and the backlight-off moment based on a driving wave of the backlights. However, this is only an example for illustrative purpose, and the backlight-on/off timing is not limited thereto. In this exemplary embodiment, the backlight on/off timing $t_b$ is the backlight-on timing of FIGS. 3 to 11 for convenience in explanation, but not limited thereto.

Figure 3:
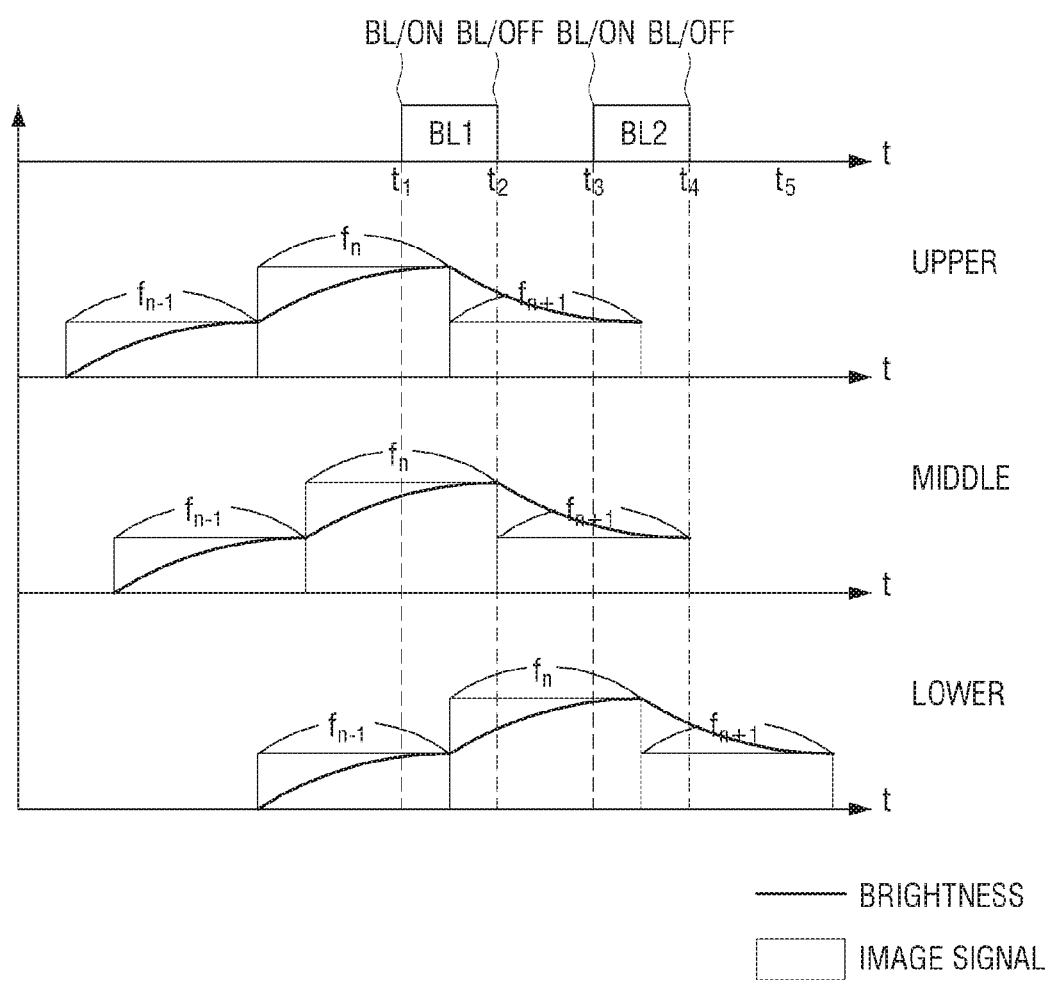
FIG. 3 is a diagram provided to describe a double image of image data outputted in a display panel, according to a method for turning on backlights in the related art.

FIG. 3 is a diagram provided to describe a double image of image data outputted in a display panel, according to a method for turning on/off backlights in the related art.

In response to the display apparatus 100 supporting the global backlight on/off, as illustrated in FIG. 3, a scanning timing of the image data in the middle region of the liquid crystal panel of the display apparatus 100 may be synchronized with the backlight-on timing.

Accordingly, in the lower region of the liquid crystal panel, the backlights BL1, BL2 may be turned on before the liquid crystal of the liquid crystal panel enters a stabilization section. In this case, in the backlight-on section t241 of the first backlight BL1, the data of the previous image frame $f_{n-1}$ and the data of the current image frame $f_n$ may be mixed and displayed in a screen of the liquid crystal panel. Further, in the backlight-on section t4-t3 of the second backlight BL2, the data of the current image frame $f_n$ and the data of a next image frame $f_{n+1}$ may be mixed and displayed in the screen of the liquid crystal panel.

In the upper region of the liquid crystal panel, the first backlight BL) may be turned on when a next frame of the image data is scanned after the liquid crystal passes the stabilization section. Accordingly, in the upper region of the liquid crystal panel, the data of the current image frame $f_n$ and the data of the next image frame $f_{n+1}$ may be mixed and displayed in the screen of the liquid crystal panel in the backlight-on section t241 of the first backlight BL1.

That is, a timing at which the backlights are turned on in the liquid crystal may be later than the scanning timing of the image data. In this case, the backlight-on timing and the scanning timing of the image data may be not synchronized for each region (for example, the upper, middle, and lower regions). Accordingly, the residual image or a double image may occur in the image displayed in the screen.

In case of the display apparatus 100 using the local backlight-on/off method, the display apparatus may not synchronize the backlight-on/off timing with the scanning timing of the image data through individual backlight-on/off control for the plurality of backlight units. In this case, the residual image or double image may occur in the image displayed in the screen.

Figure 4:
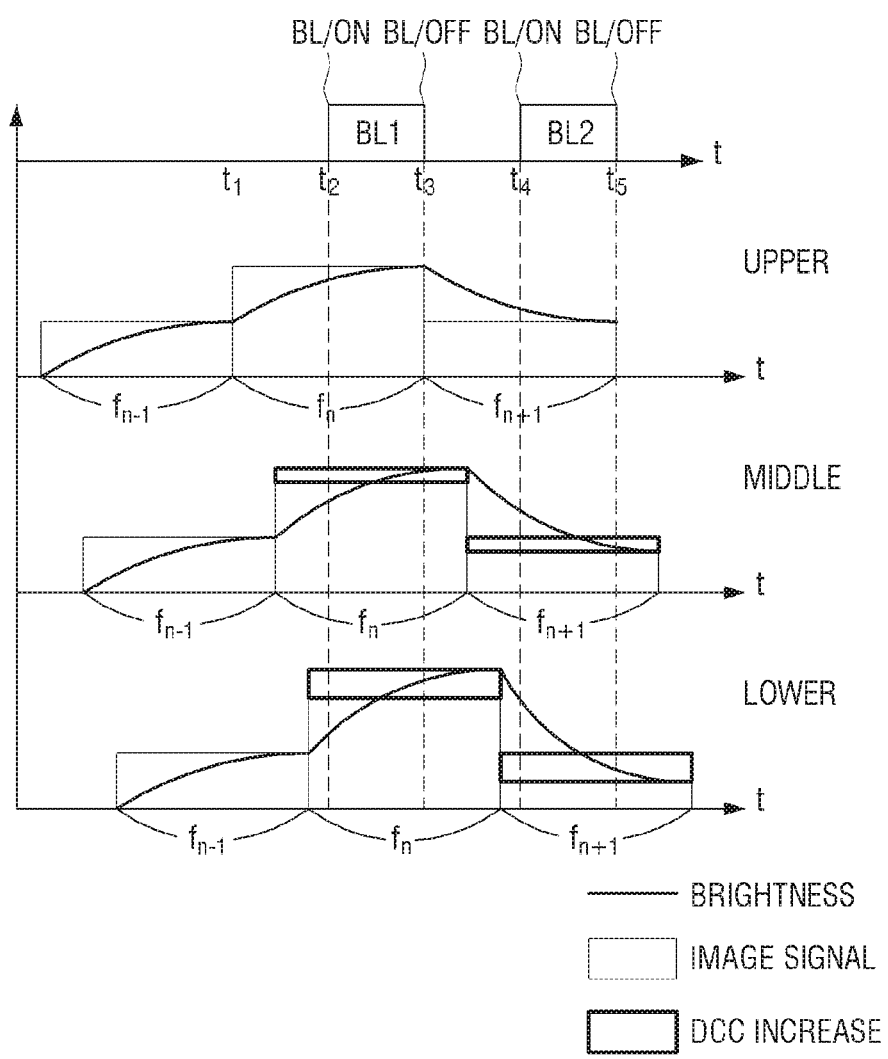
FIG. 4 is a diagram provided to describe a method for reducing a double image of image data in a display panel, according to an exemplary embodiment.

FIG. 4 is a diagram provided to describe a method for reducing a double image of image data in a display panel, according to an exemplary embodiment.

Referring to FIG. 4, the display apparatus 100 may apply different DCC gain values according to the upper, middle, and lower regions of the liquid crystal panel.

In response to information on the image data being received in the display panel 120, the information on the image data may be reflected to the liquid crystal panel of the display apparatus 100, and the display apparatus 100 may turn on the backlights when a brightness change of the liquid crystal is completed. In this case, a period for waiting till the backlights are turned on may be called 'backlight blinking section.'

In response to the same backlight blinking section being applied to the upper, middle, and lower regions of the display panel 120, the display apparatus 100 may adjust a response speed of the liquid crystal by applying different DCC gain values according to a difference between the scanning timing of the image data and the backlight-on timing of each of the regions.

According to an exemplary embodiment, the display apparatus 100 may apply a DCC gain value using the DCC look-up table pre-stored in the memory 110 to the image data in the upper region of the liquid crystal panel. Further, the display apparatus 100 may increase the DCC gain value applied to the image data in the middle lower regions of the liquid crystal panel with a later scanning timing of the image data, thereby increasing the response speed of the liquid crystal.

According to an exemplary embodiment, the display apparatus 100 may synchronize the backlight blinking section t241 for displaying the current image frame $f_n$ in the upper region of the display panel 120 and the backlight-on timing t3-t2 of the first backlight BL1 as the backlight-on timing of the entire display panel 120. Accordingly, the current image frame $f_n$ may be displayed at the backlight-on timing t3-t2 of the first backlight BL1 in the middle region of the display panel 120. Further, the current image frame $f_n$ may be displayed at the backlight-on timing t3-t2 of the first backlight BL1 in the lower region of the display panel 120. The second backlight BL2 may have the backlight-on timing t5-t4 in the same range as the first backlight BL1. That is, the backlight-on timing t3-t2 of the first backlight BL1 may have the same range with the backlight-on timing t5-t4 of the second backlight BL2. At the backlight-on timing of the second backlight BL2, the upper, middle, and lower regions of the display panel 120 may display the next image frame $f_{n+1}$. Accordingly, according to an exemplary embodiment, the residual image and double image may do not occur at the backlight-on/off timing in the entire regions of the display panel 120 of the display apparatus 100, unlike the display apparatus 100 of FIG. 3.

Figure 5:
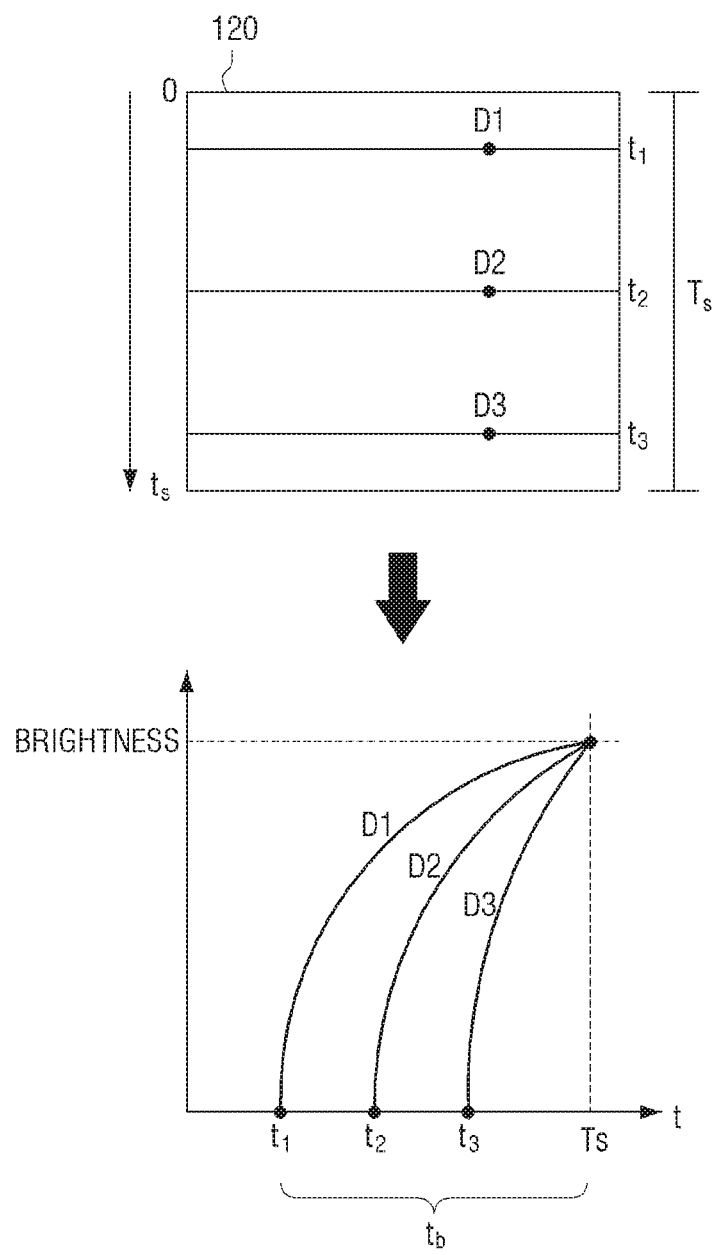
FIG. 5 is a diagram provided to describe a scanning timing of image data, according to an exemplary embodiment.

FIG. 5 is a diagram provided to describe a scanning timing of image data, according to an exemplary embodiment.

Referring to FIG. 5, in an LCD apparatus, a scanning direction of the image data may proceed in one direction of the display panel 120 (or the liquid crystal panel). As an example, the scanning of the image data may be performed from the upper region to the lower region of the display panel 120 or performed from the lower region to the upper region of the display panel 120. Further, the scanning of the image data may be performed from the middle region to the lower region or from the upper region to the middle region of the display panel 120.

As illustrated in FIG. 5, the image data may be scanned from a zero point to a part where each frame of the image data is displayed D1, D2, D3 in the entire regions of the display panel 120. For example, the image data may be displayed at D1 in the upper region, displayed at D2 in the middle region, and displayed at D3 in the lower region of the display panel 120, but not limited thereto. In this case, scanning timing t1 at which the image data is scanned at D1 may be earlier than the scanning timing t2 at which the image data is scanned at D2. Further, the scanning timing t2 at which the image data is scanned at D2 may be earlier than the scanning timing t3 at which the image data is scanned at D3.

After the timing Ts at which the image data is scanned in the entire regions of the display panel 120, the entire image data may be displayed in the screen. That is, the image data may be displayed in the display panel 120 at D1 after the timing Ts-t1 obtained by subtracting the scanning timing t1 to D1 from the entire scanning timing Ts. The image data may be displayed in the display panel 120 after the timing Ts-t2 obtained by subtracting the scanning timing t2 to D2 from the entire scanning timing Ts. Further, the image data may be displayed in the display panel 120 after the timing Ts-t3 obtained by subtracting the scanning timing t3 to D3 from the entire scanning timing Ts.

Accordingly, the time when the image data is received and then displayed in the display panel 120 may vary depending on a point of time when the image data is scanned, that is, the scanning timing of the image data. That is, the later the scanning timing of the image data (for example, the scanning timing at D2 is the latest), the shorter the time Ts-t1>Ts-t2>Ts-t3 when the image data is displayed in the display panel 120.

Referring to the lower graph of FIG. 5, it illustrates a brightness change of a pixel according to the scanning timing of the image data in each region of the display panel 120, according to an exemplary embodiment. The rate of brightness change according to the time in the upper region D1 of the display panel 120 is lower than the rate of brightness change of the middle region D2 and the lower region D3. That is, the more gentle the slope of the rate of brightness change, the longer the response time when the image data is scanned and displayed in the display panel 120.

As described above in FIG. 4, in the middle region D2 and the lower region D3 of the display panel 120, the display apparatus may increase the DCC gain values as the scanning timing of the image data increases. Accordingly, the display apparatus may shorten the response speed in each region and quicken the brightness change of the pixel in the display panel 120. That is, the DCC gain value of the image data using the DCC look-up table pre-stored in the memory may be applied to the pixel value for each pixel of the image data in the upper region D1 where the backlights are turned on as the brightness of the liquid crystal reaches a certain level. Further, for the pixel value for each pixel of the image data in the middle region D2 and the lower region D3 of the display panel 120, the DCC gain value may be calculated and applied by using a time difference between the backlight-on timing for each pixel and the scanning timing for each pixel of the image data so that the brightness of the liquid crystal reaches a certain level quickly. Accordingly, the double image may do not occur in the image data displayed in the upper, middle, and lower regions D1, D2, D3 of the display panel 120.

FIGS. 6 to 10 are diagrams provided to describe an operation of calculating a Dynamic Capacitance Compensation (DCC) value based on a scanning timing of image data, according to an exemplary embodiment.

Figure 6:
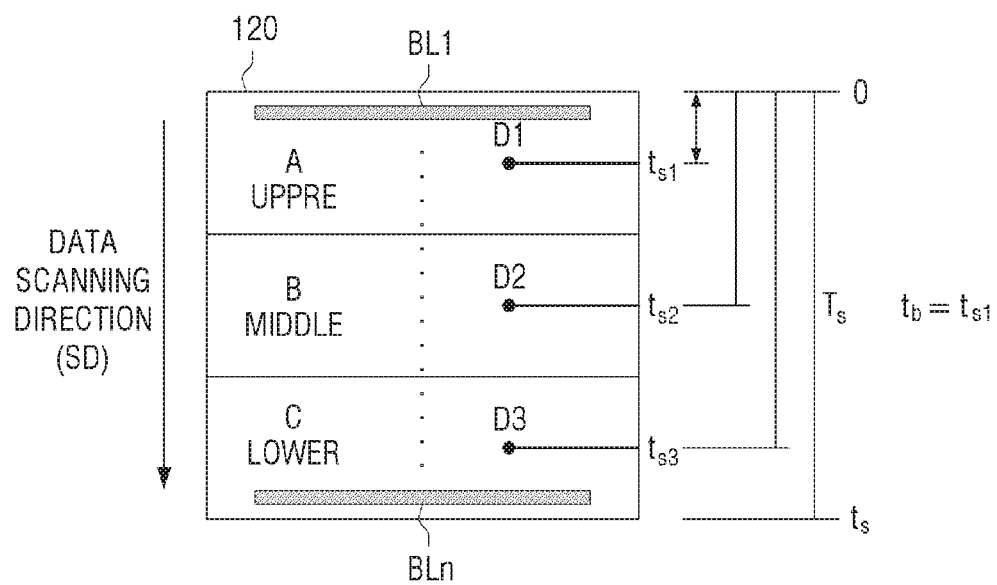
FIGS. 6 to 10 are diagrams provided to describe an operation of calculating a Dynamic Capacitance Compensation (DCC) value based on a scanning timing of image data, according to an exemplary embodiment.

Referring to FIG. 6, a scanning direction of the image data may proceed from the upper region to the lower region of the display panel 120. A plurality of backlights BL1~BLn may be arranged in a horizontal direction and from the upper region to the lower region of the display panel 120.

With reference to the point D1 at which the image data is scanned initially, the display apparatus 120 may divide the entire regions of the display panel 120 into the upper, middle, and lower regions according to the scanning timing of the image data at which the image data is scanned in the display panel 120.

As described above in FIGS. 4 and 5, according to an exemplary embodiment, the display apparatus 100 may apply the different DCC gain values of the image data to the a plurality of regions A, B, C of the display panel 120, compensate the pixel value of the image data, and output the image data.

For example, the display apparatus 100 may determine Region A including the point D1 at which the image data is scanned initially among the plurality of regions A, B, C as the upper region and divide Region B and Region C as the middle region and the lower region, respectively, according to the scanning order of the image data. In this case, the display apparatus 100 may synchronize a backlight-on timing $t_b$ for each pixel of the plurality of backlights BL1~BLn with a data scanning timing $t_{s1}$ for each pixel of an image in Region A. Accordingly, the data scanning timing for each pixel of the image data which is the reference of the backlight-on timing $t_b$ for each pixel may be $t_{s1}$.

According to an exemplary embodiment, the DCC gain values in the other regions B and C may be calculated by using a time difference $t_d$ between the backlight-on timing $t_b$ and the scanning timing $t_s$ of the image data.

The time difference $t_d$ between the backlight-on timing $t_b$ and the scanning timing $t_s$ of the image data may be calculated by using a function '$t_d(i, j)=t_s(i,j)-t_b(i, j)$.' In this case, $t_d$ may represent a time difference between the scanning timing $t_b(i, j)$ of the image data which is the reference of the backlight-on timing and the scanning timing for each pixel $t_s(i,j)$. Further, $t_b$ may be the scanning timing of the image data which is the reference of the backlight-on for each pixel of the display panel 120, $t_s$ may be the scanning timing of the image data for each pixel of the display panel 120, and (i,j) may be a pixel index of the display panel 120.

The scanning timing of the image data for each region of the plurality of regions of the display panel 120 may be a difference between a scanning-start timing and a scanning-finish timing of the image data, may be the scanning-start timing, or may be the scanning-finish timing of the image data, but not limited thereto.

As an example, in the middle region B and the lower region C, the scanning timing $t_s$ of the image data may be calculated by using a difference between the scanning-start timing of the image data (0, zero point) and the scanning-finish timing $t_{s2}$, $t_{s3}$ for each region.

As another example, the scanning timing of the image data may be $t_{s2}$ at D2 in the middle region B, and the scanning timing of the image data may be $t_{s3}$ at D3 in the lower region C.

The DCC gain values calculated in the middle region B and the lower region C may increase with the later scanning timing of the image data. That is, the greater the difference between the backlight-on timing and the scanning timing of the image data for each region, the higher the DCC gain values.

The DCC gain value may increase as the time difference $t_d$ increases by multiplying the time difference $t_d$ by the pixel brightness of the image data.

For example, in the middle region B and the lower region C, the DCC gain value for each region may be calculated by using a function '$g(i,j)=\alpha*t_d(i,j)$.' In this case, α may be a pixel value representing the pixel brightness of the image data. In the display panel 120, the pixel brightness of the image data may use the pre-stored look-up table.

The final pixel value where the image data is displayed in the display panel 20 may be calculated by using a function '$i_o(i, j)=i_i(i, j)+(i_d(i,j)-i_i(i,j))*(1+g(i_o,j))$'. In this case, $i_o$ may be the final pixel value where the image data is displayed in the display panel 120, $i_i$ may be the pixel value of the image data, and $i_d$ may be the pixel value of the image data using the pre-stored DCC look-up table.

In this case, for the DCC gain value for each region of the image data in the middle region B and the lower region C, a first pixel value may be calculated $((i_d(i,j)-i_i(i,j))$ by subtracting the pixel value $i_i(i,j)$ for each pixel of the image data from the pixel value $i_d(i,j)$ for each pixel of the image data by using the pre-stored DCC look-up table. A second pixel value may be calculated $((i_d(i,j)-i_i(i,j))*(1+g(i_o,j)))$ by multiplying the first pixel value by the DCC gain value for each region $1+g(i_o,j)$ increased according to the time difference $t_d$.

Accordingly, in response to the image data being scanned from the upper region A to the lower region C of the display panel 120, the DCC gain value for each pixel of the image data may increase gradually toward the lower region C.

Figure 7:
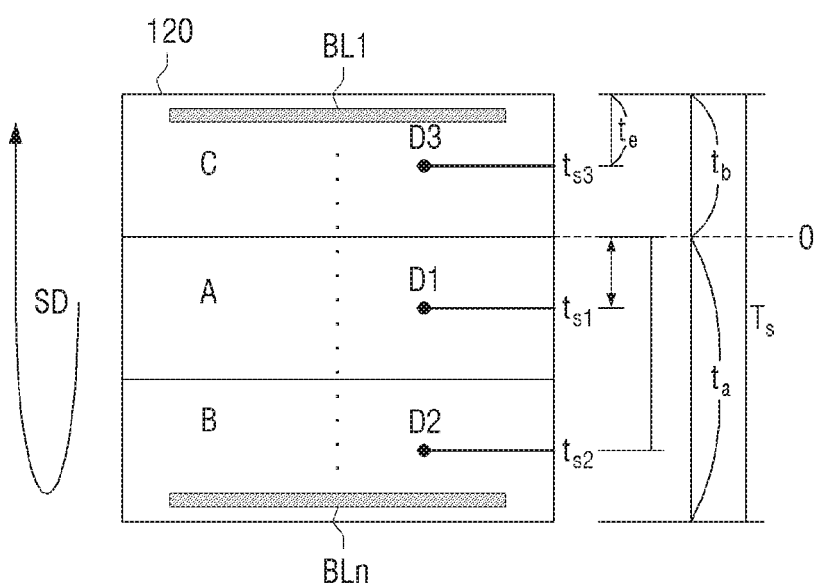

FIG. 7 is a diagram illustrating an example where the image data is scanned initially in the middle region of the display panel, according to another exemplary embodiment.

Referring to FIG. 7, an initial point at which the image data is scanned may be D1. Accordingly, the display apparatus 100 may divide the entire regions of the display panel 120 into the upper region A, the middle region B, and the lower region C based on the scanning timing $T_{s1}$ at which the image data is scanned from '0' to D1 in the entire regions of the display panel 120. In this case, the image data may be scanned in the directions from the upper region A to the middle region B, from the middle region B to the lower region C, and from the lower region C to the upper region of the display panel 120.

In this case, in the upper region A, the image data may be displayed after the scanning timing $t_{s1}$ at which the image data is scanned in the entire scanning timing $T_s$. Further, the scanning timing of the image data may be $t_{s2}$ in the middle region B, and the scanning timing of the image data may be in the lower region C.

As described above in FIG. 6, in the display panel 120, the data scanning timing tb which is the reference of the backlight-on timing may be $t_{s1}$, and the DCC gain value for each pixel of the display panel 120 may be calculated by using a function '$t_d(i, j)=t_s(i,j)-t_b(i,j)$.'

Accordingly, in case of using the function for calculating the DCC gain value described in FIG. 6, the DCC gain value for each pixel of the image data may increase gradually towards the lower region C from the upper region A. That is, the greater the difference between the backlight-on timing and the scanning timing of the image data at which the image data is scanned in each region, the higher the DCC gain value.

Figure 8:
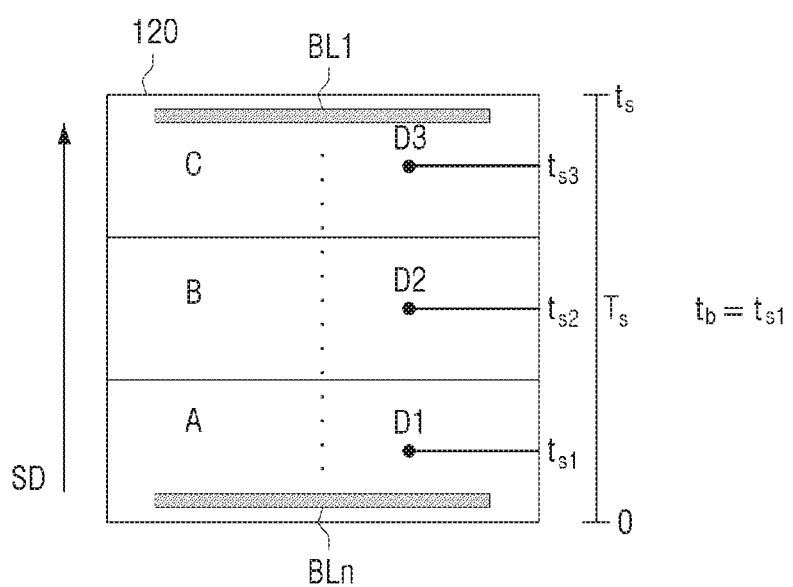

FIG. 8 is a diagram illustrating an example where the image data is scanned initially in the lower region of the display panel, according to another exemplary embodiment.

Referring to FIG. 8, an initial point at which the image data is scanned may be D1. Accordingly, the display apparatus 100 may divide the entire regions of the display panel 120 into the upper region A, the middle region B, and the lower region C based on the scanning timing $T_{s1}$ at which the image data is scanned from '0' to D1 in the entire regions of the display panel 120. In this case, the image data may be scanned in the directions from the upper region A to the to the lower region C.

In this case, in the upper region A, the image data may be displayed after the scanning timing $t_{s1}$ at which the image data is scanned in the entire scanning timing $T_s$. Further, the scanning timing of the image data may be $t_{s2}$ in the middle region B, and the scanning timing of the image data may be $t_{s3}$ in the lower region C.

In the display panel 120, the data scanning timing $t_b$ which is the reference of the backlight-on timing may be $t_{s1}$, and the DCC strength for each pixel may be calculated by using a function '$t_d(i, j)=t_s(i,j)-t_b(i, j)$.'

Accordingly, in case of using the function for calculating the DCC gain value described in FIG. 6, the DCC gain value for each pixel of the image data may increase gradually towards the lower region C from the upper region A. That is, the greater the difference between the backlight-on timing and the scanning timing of the image data at which the image data is scanned in each region, the higher the DCC gain value.

Figure 9:
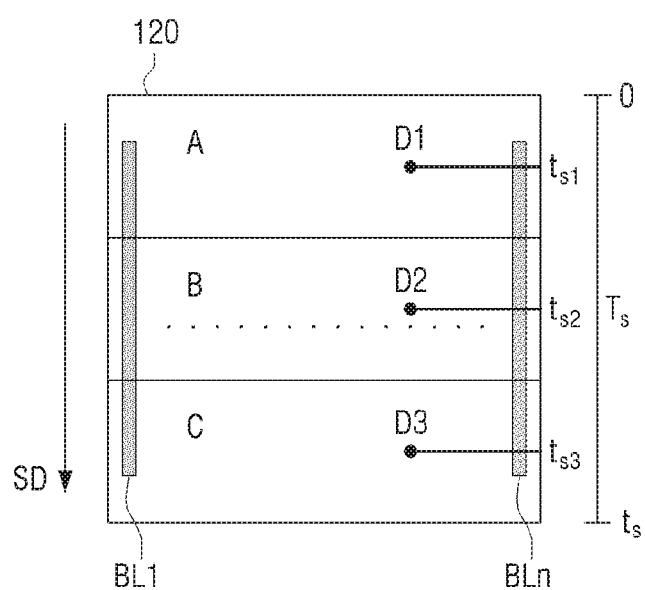

FIG. 9 is a diagram illustrating an example where a plurality of backlights are arranged in a vertical direction in the display panel, according to another exemplary embodiment.

Referring to FIG. 9, the plurality of backlights BL1~BLn may be arranged in a vertical direction in the display panel 120.

As described above in FIGS. 6 to 8, the backlight-on timing of the of the plurality of backlights BL1~BLn may be synchronized so that the backlights are turned on or turned off globally based on the scanning timing $t_{s1}$ at which the image data is scanned initially.

In this case, in case of using the function for calculating the DCC gain value described in FIG. 6, the DCC gain value for each pixel of the image data may increase gradually towards the lower region C from the upper region A.

Figure 10:
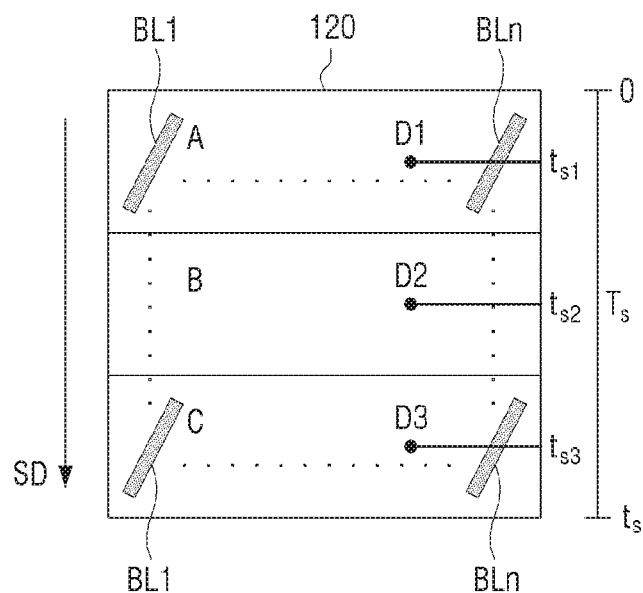

FIG. 10 is a diagram illustrating an example where a plurality of backlights are arranged in a diagonal direction in the display panel, according to another exemplary embodiment.

Referring to FIG. 10, the plurality of backlights BL1~BLn may be arranged in the display panel 120 in a diagonal direction or in a lattice manner (not shown). Further, an individual backlight may be arranged for each pixel (not shown).

As described above in FIGS. 6 to 8, the backlight-on timing of the plurality of backlights BL1~BLn may be synchronized so that the backlights are turned on or turned off globally based on the scanning timing $t_{s1}$ at which the image data is scanned initially.

In this case, in case of using the function for calculating the DCC gain value described in FIG. 6, the DCC gain value for each pixel of the image data may increase gradually towards the lower region C from the upper region A.

In FIGS. 6 to 10, the display apparatus 100 uses the global backlight-on/off method. However, the display apparatus 100 may be an apparatus using the local backlight-on/off method which turns on or turns off the backlights for each region. In this case, the plurality of backlight units may be turned on or turned off individually. For example, a backlight on the left side of the display panel 120 may be turned on earlier than a backlight on the right side of the display panel 120. In this case, the display apparatus 100 may calculate the data scanning timing $t_b(n)$ which is the reference for turning on the each backlight unit and calculate the data scanning timing $t_b(i,j)$ which is the reference for turning on the backlights for each pixel by using interpolation. Further, the display apparatus 100 may calculate the DCC gain value for each region of the display panel 120 by using the time difference $t_d$ of the scanning timing and the function described above in FIG. 6.

Figure 11:
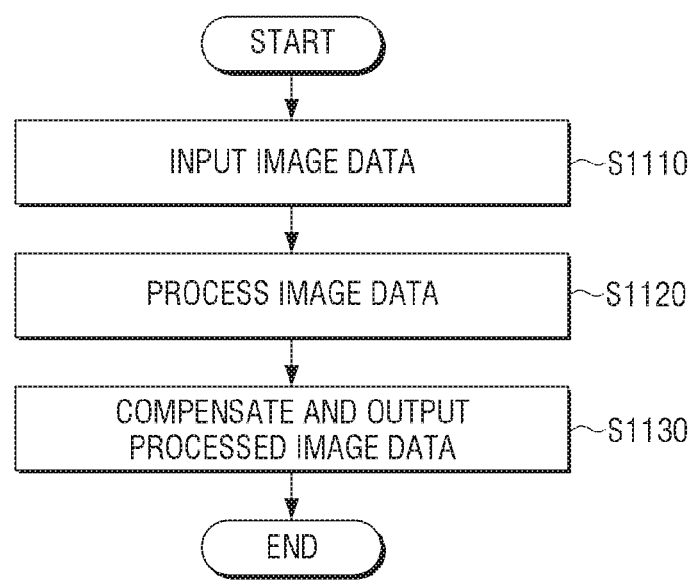
FIG. 11 is a flowchart provided to describe a method for compensating image data, according to an exemplary embodiment.

FIG. 11 is a flowchart provided to describe a method for compensating image data, according to an exemplary embodiment.

Referring to FIG. 11, in operation S1110, the display apparatus 100 may receive the image data. For example, the display panel may be a liquid crystal panel, such as, an LCD, but not limited thereto.

The image data may be received from an external source of the display apparatus 100 or may have been stored in the display apparatus 100.

In operation S1120, the display apparatus 100 may process the received image data. In this case, the processed image data may be decoded image data.

In operation S1130, the display apparatus 100 may compensate and output the processed image data.

The display apparatus 100 may divide the display panel into a plurality of regions, synchronize a scanning time of the image data at which the processed image data is scanned in at least one region among the plurality of regions with a backlight-on timing of the display panel, and output the processed image data in the display panel.

In this case, the display apparatus 100 may compensate and output the processed image data according to a relation between the scanning timing of the image data at which the processed image data is scanned in each region of the plurality of regions of the display panel and the backlight-on timing.

The method for compensating the image data was already described above in FIGS. 1 to 10, and thus, a detailed description thereof will be omitted.

According to exemplary embodiments, the display apparatus 100 and a control method thereof, regardless of whether the display apparatus supports a local backlight-on/off method or a global backlight-on/off method, may synchronize the scanning timing of the image data received in the display panel with the backlight-on/off timing. Accordingly, the display apparatus may apply different DCC gain values for each region of the display panel to increase the response speed of the liquid crystal for each region, thereby removing the residual image and the double image of the image data.

The apparatus (for example, modules or the display apparatus 100) or the method (for example, operations) according to various exemplary embodiments may be executed by at least one computer (for example, a processor) executing instructions included in at least one program among the programs maintained in a computer-readable storage media.

By way of example, the program may be stored in a computer-readable storage media, such as, a hard disc, a floppy disc, magnetic media (for example, magnetic tape), optical media (for example, a Compact Disc Read-Only Memory (CD-ROM) or Digital Versatile Disc (DVD)), magneto-optical media (for example, floptical disc), hardware devices (Read-Only Memory (ROM), Random Access Memory (RAM), or flash memory), or the like.

The storage media is included as a part of the components of the display apparatus 100 generally but may be installed through a port of the display apparatus 100. Further, the storage media may be included in an external apparatus located outside the display apparatus 100 (for example, a cloud, a server, or other electronic apparatus). The program may be divided and stored in a plurality of storage media. In this case, at least some of the plurality of storage media may be located in the external apparatus of the display apparatus 100.

As above, exemplary embodiments have been shown and described. The foregoing exemplary embodiments and advantages are merely exemplary and are not to be construed as limiting. The present teaching can be readily applied to other types of devices. Also, the description of the exemplary embodiments is intended to be illustrative, and not to limit the scope of the claims, and many alternatives, modifications, and variations will be apparent to a person having ordinary skill in the art.

What is claimed is:

1. A control method to control a display apparatus, the method comprising:
   receiving image data;
   processing the image data; and
   dividing a display panel into a plurality of regions, synchronizing a scanning timing of the image data at which the processed image data is scanned in a first region among the plurality of regions with a backlight-on timing of the display panel, and outputting the processed image data in the display panel,
   wherein the outputting the processed image data comprises:
      compensating and outputting the processed image data according to a relation between a scanning timing of the image data for each region of the plurality of regions of the display panel and the synchronized backlight-on timing;
      compensating image data included in the first region, to which a first scanning timing is applied, from among the plurality of regions based on a first Dynamic Capacitance Compensation (DCC) gain value; and
      compensating image data included in a second region, to which a second scanning timing is applied, from among the plurality of regions based on a second DCC gain value larger than the first DCC gain value, the second scanning timing being slower than the first scanning timing, and
   wherein the first region and the second region have the same backlight-on timing.

2. The control method as claimed in claim 1, wherein the compensating and outputting the processed image data comprises compensating the processed image data by applying a DCC gain value of the image data to the first region by using on a pre-stored look-up table.

3. The control method as claimed in claim 1, wherein the compensating and outputting the processed image data further comprises determining a DCC gain value according to a difference between the scanning timing of the image data for each region of the plurality of regions of the display panel and the synchronized backlight-on timing, and compensating the processed image data by applying a corresponding DCC gain value for each of the plurality of regions.

4. The control method as claimed in claim 3, wherein the second region among the plurality of regions has a later scanning timing of the image data than the first region.

5. The control method as claimed in claim 1, wherein the scanning timing of the image data at which the processed image data is scanned to the first region corresponds to a point of time when scanning of the image data starts in a center part of the first region.

6. The control method as claimed in claim 1, wherein the backlight-on timing of the display panel is synchronized with a timing at which scanning of the image data starts in the first region.

7. The control method as claimed in claim 1, wherein the backlight-on timing of the display panel is synchronized with a timing at which scanning of the image data starts in a certain region among the plurality of regions.

8. The control method as claimed in claim 1, wherein the plurality of regions are divided according to an order that the image data is scanned in the display panel.

9. The control method as claimed in claim 1, wherein the plurality of regions comprise an upper region, a middle region, and a lower region,
wherein the first region is one among the upper region, the middle region, and the lower region, and
wherein scanning of the image data starts initially in the first region according to an order that the image data is outputted in the display panel.

10. The control method as claimed in claim 9, further comprising setting the backlight-on timing and a backlight-on section based on a vertical synchronization signal of the image data.

11. A display apparatus comprising:
a display panel;
a plurality of backlights configured to supply light to the display panel;
a backlight driver configured to control the plurality of backlights; and
a processor configured to:
control the backlight driver to process image data received in the display panel, divide the display panel into a plurality of regions;
synchronize a scanning timing of the image data at which the processed image data is scanned in a first region among the plurality of regions with a backlight-on timing of the display panel;
compensate and output the processed image data according to a relation between a scanning timing of the image data for each region of the plurality of regions of the display panel and the synchronized backlight-on timing;
compensate image data included in the first region, to which a first scanning timing is applied, from among the plurality of regions based on a first Dynamic Capacitance Compensation (DCC) gain value; and
compensate image data included in a second region, to which a second scanning timing is applied, from among the plurality of regions based on a second DCC gain value larger than the first DCC gain value, the second scanning timing being slower than the first scanning timing,
wherein the first region and the second region have the same backlight-on timing.

12. The display apparatus as claimed in claim 11, further comprising a memory,
wherein the processor is further configured to compensate the processed image data by applying a DCC gain value of the image data to the first region by using a look-up table pre-stored in the memory.

13. The display apparatus as claimed in claim 11, wherein the processor is further configured to determine a DCC gain value according to a difference between the scanning timing of the image data for each region of the plurality of regions and the synchronized backlight-on timing, and compensate the processed image data by applying a corresponding DCC gain value for each of the plurality of regions.

14. The display apparatus as claimed in claim 13, wherein the second region among the plurality of regions has a later scanning timing of the image data than the first region.

15. The display apparatus as claimed in claim 11, wherein the processor is further configured to divide the plurality of regions according to an order that the image data is scanned in the display panel.

16. The display apparatus as claimed in claim 11, wherein the scanning timing of the image data at which the processed image data is scanned to the first region corresponds to a point of time when scanning of the image data starts in a center part of the first region.

17. The display apparatus as claimed in claim 11, wherein the backlight-on timing of the display panel is synchronized with a timing at which scanning of the image data starts in the first region.

18. The display apparatus as claimed in claim 11, wherein the backlight-on timing of the display panel is synchronized with a timing at which scanning of the image data starts in a certain region among the plurality of regions.

19. The display apparatus as claimed in claim 11, wherein the plurality of regions of the display panel comprise an upper region, a middle region, and a lower region,
wherein the first region is one among the upper region, the middle region, and the lower region, and
wherein scanning of the image data starts initially in the first region according to an order that the image data is outputted in the display panel.

20. The display apparatus as claimed in claim 19, wherein the processor is further configured to control the backlight driver to set the backlight-on timing and a backlight-on section based on a vertical synchronization signal of the image data.

* * * * *